United States Patent [19]

Nicholson

[11] Patent Number: 4,512,624
[45] Date of Patent: Apr. 23, 1985

[54] METHOD OF RECORDING HOLOGRAPHIC IMAGES IN WHITE LIGHT IMAGE PLANE HOLOGRAMS

[76] Inventor: Peter Nicholson, 141-17 Cherry Ave., Flushing, N.Y. 11355

[21] Appl. No.: 323,950

[22] Filed: Nov. 23, 1981

[51] Int. Cl.³ .................. G03H 1/22; G02B 27/22
[52] U.S. Cl. ............................. 350/3.69; 350/3.86
[58] Field of Search ............... 350/3.69, 3.83–3.86

[56] References Cited

U.S. PATENT DOCUMENTS

| | | | |
|---|---|---|---|
| 3,427,090 | 2/1969 | Justh et al. | |
| 3,532,406 | 10/1970 | Hartman | |
| 3,556,631 | 1/1971 | Cook | |
| 3,633,989 | 1/1972 | Benton | 350/3.69 |
| 3,644,012 | 2/1972 | Brooks | |
| 3,838,908 | 10/1974 | Leith et al. | 350/3.69 |

OTHER PUBLICATIONS

Bazargan et al., "An Image-Plane Hologram with Non-Image-Plane Motion Parallax", Optics Communications, vol. 32, No. 1, Jan. 1980, pp. 45–47.

*Primary Examiner*—Bruce Y. Arnold
*Attorney, Agent, or Firm*—Brumbaugh, Graves, Donohue & Raymond

[57] ABSTRACT

A method of producing a real image plane hologram illuminable by a white light point source is disclosed. A transmission hologram, which is produced by either a diverging reference beam or a collimated reference beam, is positioned relative to a reconstruction beam which is the conjugate time reversed beam of the reference beam used to create the real image on the transmission hologram. A mask defining a generally elliptically-shaped opening is placed over the transmission hologram to construct the real image. A photographic plate is positioned in a plane generally parallel to the plane containing the transmission hologram, approximately at the location of the reconstructed real image. A converging reference beam is then directed at the photographic plate to create a real image plane hologram. The real image can be reconstructed from the real image plane hologram by illuminating it with a diverging white light point source at the conjugate time reversed position of the converging reference beam. Steps are also disclosed for enlarging or reducing the image recorded in the image plane hologram relative to the size of the image recorded in the transmission plane hologram, while minimizing spectral dispersion and maximizing achromaticity.

2 Claims, 7 Drawing Figures

METHOD OF RECORDING HOLOGRAPHIC IMAGES IN WHITE LIGHT IMAGE PLANE HOLOGRAMS

BACKGROUND OF THE INVENTION

1. Technical Field of the Invention

This invention relates to producing image plane holograms and more particularly to recording white light image plane holograms by a two step process.

2. Description of the Prior Art

When recording images by a holographic process, it is very important that the images are recorded accurately and with a high degree of precision and quality control. This is particularly true when the object to be recorded is a human subject or any other subject where lifelike reconstruction and clarity of the image is desired.

Most of the equipment available for holographic recording is both expensive and beyond the capability of all but an experienced and skilled operator. Furthermore, live subject matter, e.g. portraits of human subjects, demands the use of pulse laser cameras, having attendant increased costs and difficulties. Also it is necessary when reconstructing a pulse laser transmission hologram to use a filtered or monochromatic point source such as an expensive continuous-wave laser or a filtered, mercury-arc lamp. Thus, it would be desirable to provide a process by which individuals could record transmission holograms and have image plane holograms produced from a transmission hologram by a laboratory or other facility.

Further, it would be desirable to develop a method or process for producing image plane holograms having a recorded image which is either enlarged or reduced from the image of the transmission hologram, and having maximum achromaticity and minimum spectral dispersion.

Also, it would be desirable to be able to reconstruct images from resulting image plane holograms by using a relatively inexpensive white light source, which would also be relatively safe to use.

SUMMARY OF THE INVENTION

In accordance with the present invention, a method for producing white light image plane holograms from transmission holograms is provided. The transmission hologram preferably would have the subject image lying about 12-15" behind the image plane. The white light images are then transferred from the master transmission hologram to an image plane hologram, during which time an operator controls various parameters. This would allow for greater selectivity and additional artistic inputs during the transfer process. Of course, this would also permit the making of numerous image plane holograms from a single master transmission hologram. The image plane hologram could have recorded image characteristics either similar to or different from the master transmission hologram. In this way, a wide variety of image plane holograms can be obtained even though the subject or object need only sit for one master transmission hologram. The resulting image plane holograms are illuminable by a relatively inexpensive white light source.

More particularly, the invention comprises the steps of directing a reconstruction beam at a previously exposed transmission hologram which was produced with either a diverging reference beam or collimated reference beam. The reconstruction beam used should be the conjugate time-reversed beam of the reference beam used to create the transmission hologram. A photographic hologram plate is positioned in a plane generally parallel to the plane containing the transmission hologram and at a position approximately at the location of the reconstructed real image. A converging reference beam is directed at the photographic plate to create a real image plane hologram. By illuminating the photographic plate with a diverging white light point source at the conjugate time reversed position of the converging reference beam, the real recorded image can be reconstructed simply and easily.

Numerous other advantages and features of the present invention will become readily apparent from the following detailed description of the invention and of one embodiment thereof, from the claims and from the accompanying drawings.

DETAILED DESCRIPTION OF THE PREFERRED EMBODIMENT

Figure 1A:
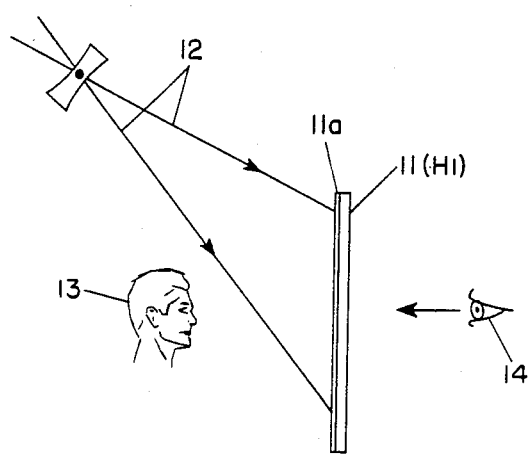
FIGS. 1A, 1B and 1C are side elevational views illustrating the respective steps of making a transmission hologram, making an image plane hologram from the transmission hologram and reconstructing the image from the image plane hologram.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

As shown in FIG. 1A, a conventional pulse laser transmission hologram 11, having an emulsion side 11a, is shown being made with a diverging reference beam 12 (or it could be made with a collimated reference beam). The object beam is not shown. This process creates a virtual image 13, which in this case is a human subject, when reconstructed and viewed from position 14.

Figure 1B:
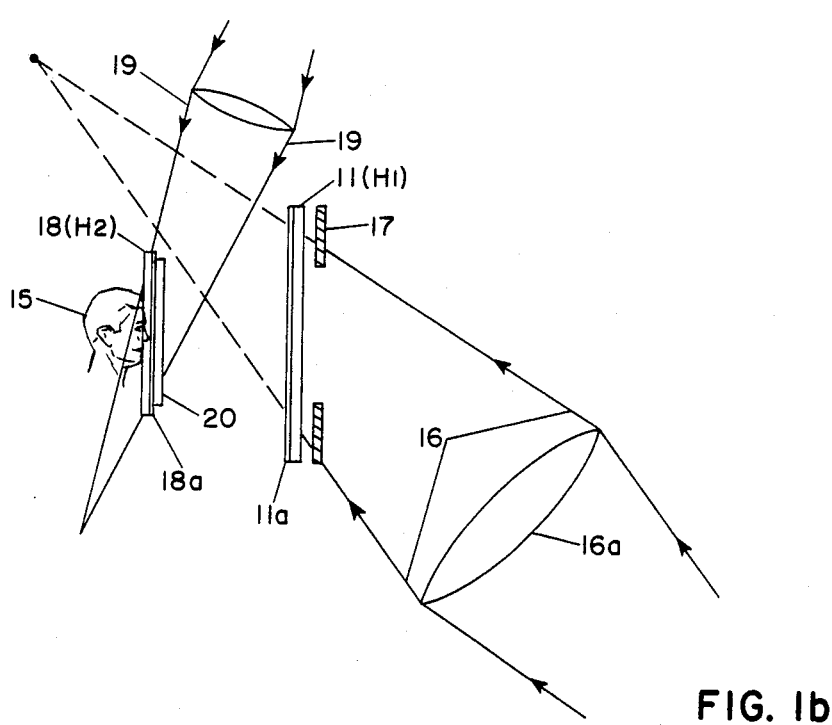

As shown in FIG. 1B, the real image 15 is reconstructed by illuminating the transmission hologram 11 with a conjugate, time-reversed reconstruction beam 16. This conjugate time reversed reconstruction beam would be a converging beam if the reference beam used in the recording stage is a diverging reference beam, and would be a collimated beam if the reference beam used in the recording stage was likewise a collimated beam. FIG. 1B also shows the cross section of a mask 17 which will be described below in conjunction with FIG. 2. This mask is placed between the reconstruction beam 16 and the transmission hologram 11. A photographic hologram plate 18 is positioned in a plane generally parallel to the plane containing the transmission hologram 11 and a position approximately at the location of the reconstructed real image 15, and having its emulsion side 18a and the emulsion side 11a of transmission hologram 11 faced toward each other. A second hologram is then created by directing a converging reference beam 19 at the photographic plate.

When the subject or object being recorded is a human subject, it is preferred that the photographic plate 18 be placed at a position so that one or more reference points, which in this case are the eyes and chin of the real image 15, are sharply focused on the image plane. This desired positioning can be accomplished by placing a ground glass screen 20 at the intersection of the real image 15 and the plane containing the photographic hologram plate 18, and moving the ground glass screen 20 and photographic plate 18 until maximum sharpness of the reference points, i.e. eyes and chin, are obtained.

Figure 1C:
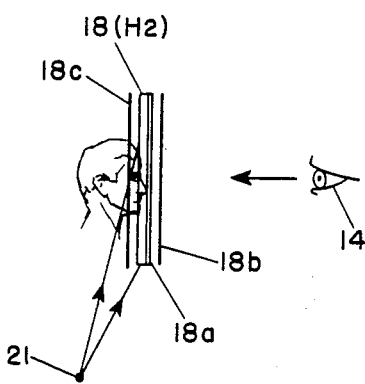

Turning now to FIG. 1C, it is seen that the image plane hologram produced as shown in FIG. 1B can be illuminated by a diverging white light source 21 which is positioned at the conjugate time reversed position of the converging reference beam 19 of FIG. 1B. It should be understood that the plate 18 be positioned so that its emulsion side 18a is faced opposite to the diverging white light point source 21.

Figure 2:
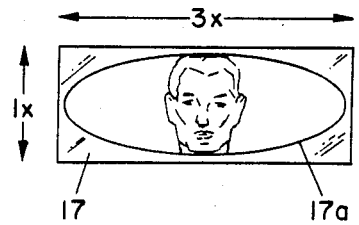
FIG. 2 is a front elevational view of the preferred configuration of a mask.

It is desirable and preferable to produce the transmission hologram 11 as wide as possible in order to obtain as wide an angle of view as possible. It is also desirable to obtain as much horizontal parallax as it appropriate considering the width of the reconstruction beam 16 as determined by the size of the lens 16a. Optimal results have been obtained when the ratio of the width of the hologram to the height of the hologram is three to one. Such a ratio results in wide horizontal parallax and sufficient vertical parallax to create an achromatic planar image. When using this kind of white light, the resultant image is sharp and achromatic at or near the image plane intersection points, but for points in front of or behind the image plane, increasing rainbow or spectral dispersion results. To help overcome these effects, a mask 17 is placed at the position shown in FIG. 1B. As shown in FIG. 2 the mask defines a generally elliptically shaped opening 17a having its longer axis disposed in the horizontal direction and more specifically having its width dimension and its height dimension in a ratio of three to one. When the subject is a human subject, the side views of the face will result in a situation approaching a slit rainbow or Benton hologram.

Peculiar to this type of achromatic image plane hologram is that in the reconstruction process, the white light illumination source 21 is behind the hologram 18 with the emulsion surface 18a on the front of the hologram. The emulsion side 18a can be protected from wear and tear by coating the plate with a thick application of a clear resin 18b having an index of refraction similar to that of the emulsion 18a and underlying substrate. Further, suitable dyes can be added to the resin to create a broad, band-pass filter that will suppress unwanted spectral dispersion while also giving a more pleasing skin tone to the subject image. One or more similar broad, band-pass filters 18c can be placed between the white light source 21 and the hologram to achieve a similar effect. The filters 18c can be formed by applying photoresist or any other photosensitive deposit emulsion to a clear colored transparent substrate, e.g. plexiglass. However, several advantages are achieved by coating the emulsion side of the plate with a suitable dyed resin. Firstly, the brightness of the hologram is enhanced. Secondly, the noise level of the hologram due to scatter effects is reduced. Also, noise from the imperfections in the filtering medium and from dust gathering on the filtering medium is substantially eliminated.

Figure 3A:
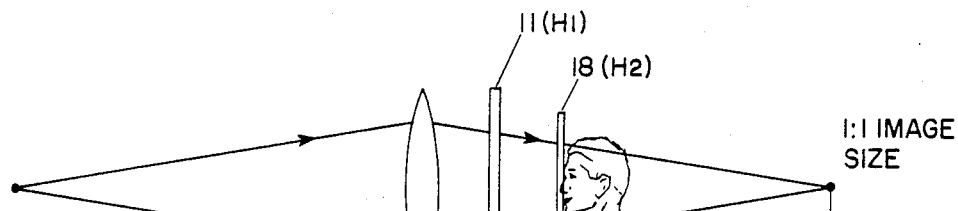
FIGS. 3A, 3B and 3C are side elevational views illustrating steps for making an image plane hologram having an image generally equal to, larger than and smaller than the image of the transmission hologram, respectively.
Figure 3B:
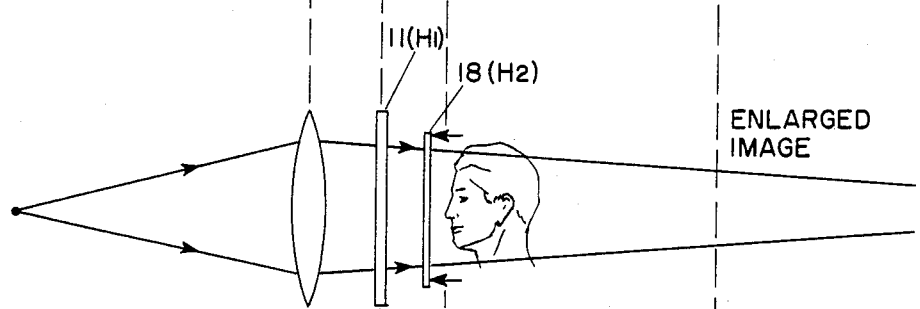
Figure 3C:
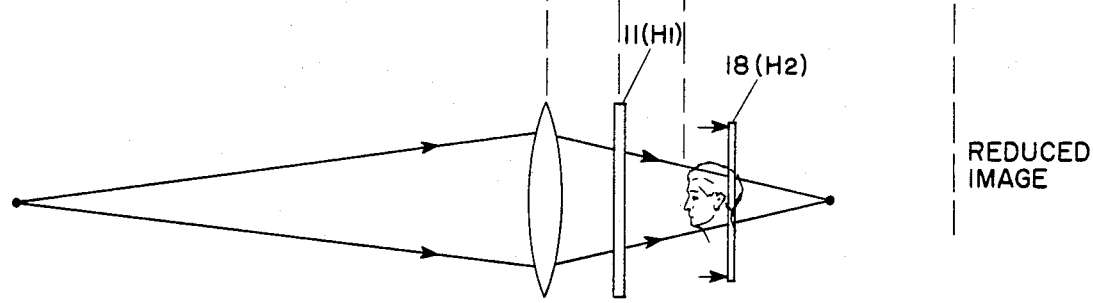

FIGS. 3A, 3B and 3C illustrate the additional steps which can be undertaken to enlarge, reduce and otherwise control the size of the image of a transfer achromatic white light image plane hologram. When it is desired to create an image plane hologram having an image substantially equal to that recorded in the transmission hologram, the reconstruction beam 16 should be made to converge at a point behind the hologram so that the point of divergence of the reference beam and of the reconstruction beam are generally equal. To put it another way, the real image is created with a time reversed conjugate to the reference beam. In this case as shown in FIG. 3A, the holographic plate 18 should be in a plane which intersects selected frontal portions of the subject, which in this case for a human subject would be the eyes and lips, in order to minimize spectral dispersion.

However, to create an image in the image plane hologram larger than the image of the transmission hologram, the reconstruction beam 16 should be made to converge at a point behind the hologram a distance greater than the distance of the point of divergence of the original reference beam. This will cause the defracted light rays to diverge somewhat from their initial course, creating an enlarged real image. For maximum achromaticity in this case, the holographic plane should be positioned at a location forward of the reconstructed image, as shown in FIG. 3B.

In order to produce an image which is reduced in size from the original image, the reconstruction beam should be made to converge at a point behind the hologram a distance less than the distance of the point of divergence of the original reference beam. This will cause the defracted light rays to converge from their original course, creating a reduced real image as shown in FIG. 3C. In this case, for maximum achromaticity, the image plane hologram 18 should be positioned at a location beyond the most frontal portions of the reconstructed image, which for a human subject would be about in the middle of the head as shown in FIG. 3C.

From the foregoing, it will be observed that numerous variations and modifications may be effected without departing from the true spirit and scope of the novel concept of the invention. It is to be understood that no limitation with respect to the specific method illustrated herein is intend or should be inferred. It is, of course, intended to cover by the appended claims all such modifications as fall within the scope of the claims.

I claim:

1. A method of producing a real image plane hologram from a transmission hologram produced with a diverging reference beam, and containing a recorded holographic image, comprising the steps of:

placing a mask defining a generally elliptically-shaped opening over the transmission hologram;

directing a reconstruction beam at the transmission hologram, to reconstruct a real image of the recorded holographic image, said beam being the conjugate, time-reversed beam of the reference beam used to create the transmission hologram;

positioning a photographic hologram plate in a plane generally parallel to the plane containing the transmission hologram and approximately at the location of the reconstructed real image;

directing a converging reference beam at the photographic plate to thereby create a real image plane hologram, whereby the real recorded image can be reconstructed by illuminating the real image plane hologram with a diverging white light point source at the conjugate time reversed position of the converging reference beam when the plate is positioned having its emulsive side opposite to the diverging white light point source.

2. The method in accordance with claim 1 wherein the length of the horizontal axis of the opening and the length of the vertical axis of the opening are in the ratio of approximately three to one.

* * * * *